US012587573B2

(12) United States Patent
Pocovi et al.

(10) Patent No.: US 12,587,573 B2
(45) Date of Patent: Mar. 24, 2026

(54) REPORTING OF DELTA CHANNEL QUALITY INDICATOR (CQI)-MODULATION AND CODING SCHEME (MCS) INFORMATION

(71) Applicant: Nokia Technologies Oy, Espoo (FI)

(72) Inventors: Guillermo Pocovi, Aalborg (DK); Salah Eddine Hajri, Nozay (FR); Lauri Ilari Kuru, Espoo (FI); Keeth Saliya Jayasinghe Laddu, Espoo (FI); Elena Peralta Calvo, Tampere (FI)

(73) Assignee: Nokia Technologies Oy, Espoo (FI)

( * ) Notice: Subject to any disclaimer, the term of this patent is extended or adjusted under 35 U.S.C. 154(b) by 119 days.

(21) Appl. No.: 18/560,396

(22) PCT Filed: Apr. 8, 2022

(86) PCT No.: PCT/EP2022/059350
§ 371 (c)(1),
(2) Date: Nov. 12, 2023

(87) PCT Pub. No.: WO2022/238060
PCT Pub. Date: Nov. 17, 2022

(65) Prior Publication Data
US 2024/0250994 A1     Jul. 25, 2024

Related U.S. Application Data

(60) Provisional application No. 63/186,948, filed on May 11, 2021.

(51) Int. Cl.
| | |
|---|---|
| *H04L 61/5084* | (2022.01) |
| *H04L 9/40* | (2022.01) |
| *H04L 61/4511* | (2022.01) |

(52) U.S. Cl.
CPC .......... *H04L 63/20* (2013.01); *H04L 61/4511* (2022.05); *H04L 61/5084* (2022.05)

(58) Field of Classification Search
CPC .... H04L 61/5084; H04L 1/0003; H04W 8/26; H04W 80/04
See application file for complete search history.

(56) References Cited

U.S. PATENT DOCUMENTS

| | | | | |
|---|---|---|---|---|
| 2019/0052397 A1* | 2/2019 | Onggosanusi | ........ | H04L 1/0016 |
| 2019/0288801 A1* | 9/2019 | Yang | ..................... | H04L 5/0055 |
| 2022/0408445 A1* | 12/2022 | Sun | ..................... | H04B 7/0486 |
| 2023/0171592 A1* | 6/2023 | Han | ........................ | H04W 8/20 |
| | | | | 370/328 |

(Continued)

FOREIGN PATENT DOCUMENTS

WO        2020/072899 A1      4/2020

OTHER PUBLICATIONS

"3rd Generation Partnership Project; Technical Specification Group Radio Access Network; NR; Physical layer procedures for data (Release 16)", 3GPP TS 38.214, V16.5.0, Mar. 2021, pp. 1-171.
(Continued)

*Primary Examiner* — Hee Soo Kim
(74) *Attorney, Agent, or Firm* — Barta Jones, PLLC

(57) ABSTRACT

Systems, methods, apparatuses, and computer program products for reporting of delta channel quality indicator (CQI)/modulation and coding scheme (MCS) feedback are provided.

14 Claims, 4 Drawing Sheets

(56) References Cited

U.S. PATENT DOCUMENTS

| 2023/0224953 A1* | 7/2023 | Xiong | ................... | H04L 1/0009 |
| | | | | 370/329 |
| 2024/0172224 A1* | 5/2024 | Xiong | ................... | H04W 72/21 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NR; Physical layer procedures for control (Release 16)", 3GPP TS 38.213, V16.5.0, Mar. 2021, pp. 1-183.

"Feature lead summary #4 on CSI feedback enhancements for enhanced URLLC/IIoT", 3GPP TSG RAN WG1 #104b-e, R1-2103956, Agenda: 8.3.1.2, InterDigital Inc., Apr. 12-20, 2021, 90 pages.

"CSI enhancement for IOT and URLLC", 3GPP TSG RAN WG1 #104bis, R1-2103164, Agenda: 8.3.1.2, Qualcomm Incorporated, Apr. 12-20, 2021, pp. 1-21.

"CSI feedback enhancements for URLLC/IIoT", 3GPP TSG RAN WG1 #104b-e, R1-2103611, Agenda: 8.3.1.2, Lenovo, Apr. 12-20, 2021, 4 pages.

"Considerations on CSI feedback enhancements", 3GPP TSG RAN WG1 #104bis-e, R1-2103301, Agenda: 8.3.1.2, Sony, Apr. 12-20, 2021, 3 pages.

"Discussion on CSI feedback enhancements for eURLLC", 3GPP TSG RAN WG1 Meeting #104b-e, R1-2102494, Agenda: 8.3.1.2, ZTE, Apr. 12-20, 2021, pp. 1-9.

International Search Report and Written Opinion received for corresponding Patent Cooperation Treaty Application No. PCT/EP2022/059350, dated Aug. 10, 2022, 14 pages.

"On UCI Enhancements for URLLC", 3GPP TSG RAN WG1#96, R1-1901914, Agenda: 7.2.6.1.2, Nokia, Feb. 25-Mar. 1, 2019, 10 pages.

"CSI definition for Rel-13 MTC", 3GPP TSG-RAN WG1 Meeting #83, R1-157386, Agenda: 6.2.1.8, MediaTek Inc., Nov. 15-22, 2015, 4 pages.

"CSI feedback enhancements for URLLC/IIoT use cases", 3GPP TSG RAN WG1 #105-e, R1-2105580, Agenda: 8.3.1.2, Nokia, May 10-27, 2021, 17 pages.

"CSI feedback enhancements for URLLC/IIoT use cases", 3GPP TSG RAN WG1 #106-e, R1-2107019, Agenda: 8.3.1.2, Nokia, Aug. 16-27, 2021, 6 pages.

* cited by examiner

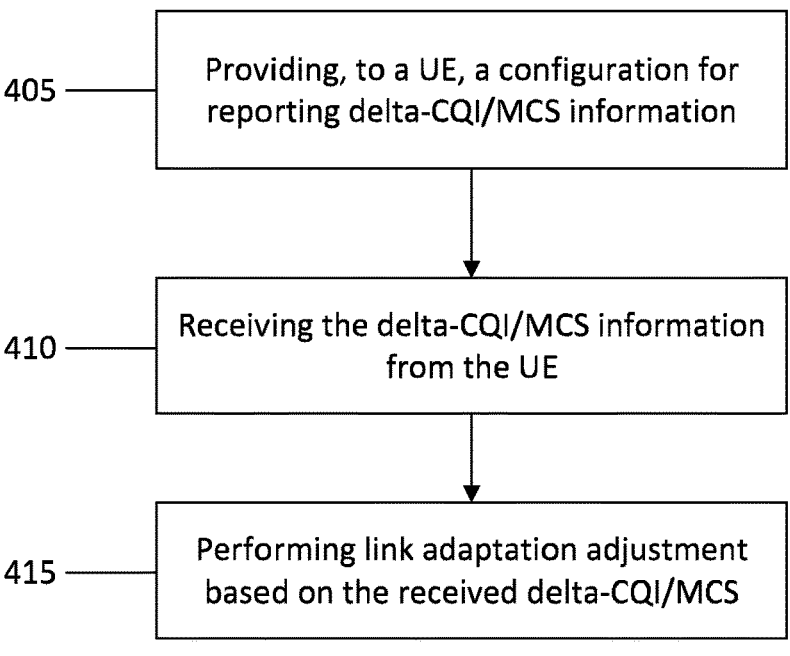

405 — Providing, to a UE, a configuration for reporting delta-CQI/MCS information 410 — Receiving the delta-CQI/MCS information from the UE 415 — Performing link adaptation adjustment based on the received delta-CQI/MCS

Fig. 4A

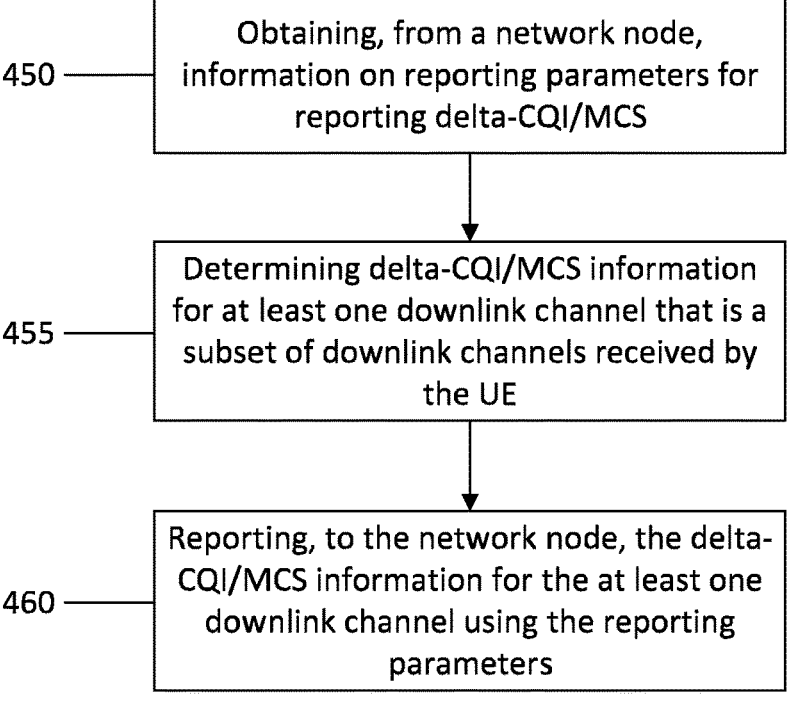

450 — Obtaining, from a network node, information on reporting parameters for reporting delta-CQI/MCS 455 — Determining delta-CQI/MCS information for at least one downlink channel that is a subset of downlink channels received by the UE 460 — Reporting, to the network node, the delta-CQI/MCS information for the at least one downlink channel using the reporting parameters

Fig. 4B

REPORTING OF DELTA CHANNEL QUALITY INDICATOR (CQI)-MODULATION AND CODING SCHEME (MCS) INFORMATION

RELATED APPLICATION

This application was originally filed as PCT Application No. PCT/EP2022/059350, filed on Apr. 8, 2022, which claims priority from U.S. Provisional Application No. 63/186,948, filed on May 11, 2021, each of which is incorporated herein by reference in its entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for reporting of delta channel quality indicator (CQI)/modulation and coding scheme (MCS) feedback.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 4A illustrates an example flow diagram of a method, according to an embodiment;

FIG. 4B illustrates an example flow diagram of a method, according to an embodiment;

DETAILED DESCRIPTION

Figures 1, 2:
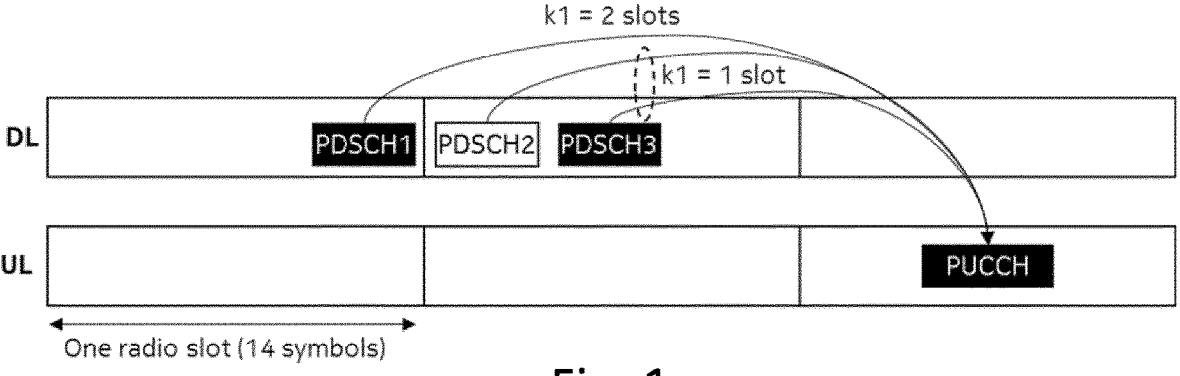
FIG. 1 illustrates an example of mapping of hybrid automatic repeat request (HARQ) and delta-channel quality indicator (CQI)/modulation and coding scheme (MCS) feedback to a physical uplink control channel (PUCCH)
FIG. 2 illustrates an example of mapping delta-CQI/MCS feedback to a periodically-configured PUCCH, using a gNB-defined time window of 2 slots.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for reporting of delta channel quality indicator (CQI)/modulation and coding scheme (MCS) feedback, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

NR channel state information (CSI) reporting framework, as provided by 3GPP Release-15 and Release-16, is a considerable improvement compared to previous generations. However, CQI reporting is not redesigned in NR, and is the same as that of LTE. Therefore, CSI enhancements continue to be a focus in 3GPP, especially considering better support of IIoT/URLLC services. In NR Release-17, CSI enhancements are considered, for port selection codebook, taking into consideration uplink (UL)/downlink (DL) partial reciprocity, CSI reporting for multiple transmission-reception point (multi-TRP) and CSI enhancements for IIoT and URLLC.

One of the objectives for NR Release-17 is enhancing physical layer (PHY) feedback for meeting URLLC requirements covering UE feedback enhancements for hybrid automatic repeat request (HARQ) acknowledgement (ACK), and for CSI feedback enhancements to allow for more accurate MCS selection and link adaptation.

The ongoing discussion in NR Release-17 strives to study and evaluate possible CSI enhancement schemes for enhancing MCS selection in terms of technical benefits, complexity and specification impact. The candidate schemes for new CSI quantities were classified into two categories, namely, case 1 and case 2. Case 1 includes proposals with quantities computed based on channel and interference measurements and case 2 includes proposals with quantities computed based on physical downlink shared channel (PDSCH) decoding.

Certain example embodiments described herein may address at least case 2. The overall goal of case 2 enhancements may include to provide, to the gNB, new feedback information (in addition to existing HARQ binary ACK/NACK feedback) derived from the PDSCH decoding, which allows the gNB to take better scheduling/link adaptation decisions for future transmissions and steer outer-loop link adaptation efficiently in URLLC use cases. It is expected that the alternative of reporting delta-CQI/MCS will be adopted, indicating the difference between the MCS selected by the gNB for the PDSCH transmission and the ideal MCS that should have been used to guarantee a certain block error rate (BLER) target (e.g., 1E-5 as commonly required for URLLC/IIoT use cases), as seen by the UE. While the overall target BLER of a given service flow may be constant at higher layers (SDAP layer handles the QoS-profiles of 5G traffic in RAN), the PHY layer BLER target may vary dynamically, for example, because of differences in the remaining latency budget of each TB. However, this is not a problem when determining the delta-CQI/MCS that will be reported, as UE may use an assumed target BLER which gNB can configure explicitly or implicitly, e.g., the CQI feedback table that gNB configures for the reporting also implies a target BLER that the UE shall use in CQI reporting.

One aspect that has not yet been decided is whether the delta-CQI/MCS shall be reported for correctly-received or incorrectly-received TBs/PDSCH transmissions (or both). In case the delta-CQI/MCS is reported together with a negative HARQ feedback (NACK), i.e., corresponding to an incorrectly-received TB received via PDSCH, the delta-CQI/MCS can be used to adjust the MCS used for the retransmission of the TB (and future transmissions as well); whereas if it is reported together with a positive HARQ feedback (ACK), i.e., corresponding to a correctly-received TB via PDSCH, the delta-CQI/MCS can also be used to adjust the MCS in a proactive manner for future TBs/PDSCH transmissions even if no decoding errors have occurred.

It is noted that, even though the term "delta"-CQI/MCS is used herein, the reported information is not necessarily an offset between the actual-MCS of the scheduled PDSCH and the recommended MCS, but could also be the absolute MCS/CQI index suggested by the UE determined from the PDSCH reception. Therefore, in certain embodiments, "delta-CQI/MCS" may refer to either an offset between the actual-MCS of the scheduled PDSCH and the recommended MCS, or the absolute MCS/CQI index provided by the UE determined from the PDSCH reception. Indeed, use of the absolute MCS/CQI index does not require having to define a 'link' between the received PDSCH and the corresponding delta-CQI/MCS feedback.

One motivation for feedback enhancements for URLLC use cases is to allow more accurate MCS selection for link adaptation. In order to achieve a target BLER, up until NR Release-16, an outer-loop link adaptation (OLLA) scheme was typically used to correct inaccuracies and fine-tune the MCS selection, where only binary ACK/NACK feedback is reported for each TB reception. With URLLC, NACKs may be nearly non-existent, which means that the traditional OLLA cannot converge and a new type of input is needed for OLLA.

With the potential introduction of additional delta-CQI/MCS feedback for case 2 new reporting based on PDSCH decoding for OLLA performance enhancement, there are a number of open issues that need to be addressed. For instance, these issues may include: i) for which TBs/PDSCHs the delta-CQI/MCS feedback shall be reported (if not for all), ii) whether the delta-CQI/MCS information shall be considered as an 'extension' of existing HARQ-ACK feedback or as a new-reporting quantity configured as part of CSI feedback, and iii) how this new feedback should be constructed/generated and reported to the gNB, especially for the case where feedback for more than one TB/PDSCH needs to be reported on the same physical uplink control channel (PUCCH).

Certain embodiments may provide systems and/or methods for the configuration, generation and reporting of delta-CQI/MCS feedback, including related signaling procedures. For example, some embodiments may provide methods for determining for which subset of the gNB-scheduled TBs/PDSCHs the delta-CQI/MCS feedback should be reported, and/or methods for multiplexing of delta-CQI/MCS information with existing HARQ-ACK feedback information, including 'compression rules' for cases where more than one delta-CQI/MCS is mapped to the same physical uplink control channel (PUCCH). Alternatively or additionally, certain embodiments may provide methods for configuring delta-CQI/MCS reporting resource and timing as part of CSI reporting settings, including a time window definition for which the feedback from applicable PDSCHs shall be collected. It is noted that, although certain embodiments are described herein using PDSCH as one example, other example embodiments may be applicable to other similar channels and reporting delta-CQI/MCS thereof.

According to certain embodiments, a gNB may configure a UE to report delta-CQI/MCS feedback. In some embodiments, the delta-CQI/MCS may be determined based on received TB or part of a TB. For example, PDSCH may carry a TB or part of a TB with different schemes provided in NR. In one embodiment, the delta-CQI/MCS feedback may be limited to a subset of the gNB-scheduled TBs/PDSCHs (these TBs/PDSCHs may be referred to as 'applicable PDSCH' elsewhere herein). In an embodiment, the subset of the gNB-scheduled PDSCHs may be determined based on one or a combination of the following: PDSCHs associated to certain physical layer priority, e.g., for only high-priority PDSCHs (where the priority is given in the DCI scheduling the PDSCH as supported in Release-16); PDSCHs with transport block size (TBS) below or above a certain network-configured value, or with a MCS above or below a certain configured MCS index; PDSCHs with associated PDSCH-to-HARQ_feedback timing indicator (also known as k1) below or above a certain value; PDSCHs scheduled with a certain DCI format (e.g. DCI format 1_2, which was standardized in Release-16 with focus on URLLC) or with certain radio network temporary identifier (RNTI, e.g., MCS-C-RNTI); PDSCHs which are transmitted only with a predefined redundancy version (RV, e.g., RV0); PDSCHs which are corresponding only to initial transmissions (based on NDI); PDSCHs that are transmitted with a certain multiple-input multiple-output (MIMO) rank;

PDSCHs associated to certain (network-configured) HARQ processes IDs; the need for reporting delta-CQI/MCS feedback may also be dynamically indicated by the gNB with a new field in the DCI scheduling the PDSCH; and/or delta-CQI/MCS reporting may be activated/deactivated via MAC-level signalling, e.g., MAC-CE, for one or multiple PDSCHs verifying one or a combination of the aforementioned applicability criteria.

In one embodiment, the delta-CQI/MCS feedback may be appended to the HARQ-ACK information generated by the UE. According to Release-16, the PUCCH carrying HARQ-ACK feedback (and thus also carrying the appended delta-CQI/MCS feedback) is derived from the PDSCH-to-HARQ_feedback timing indicator k1 (providing the time offset between the PDSCH reception and the target (sub)slot for the PUCCH) and the PUCCH resource indicator (PRI, indicating the specific PUCCH resource to use) fields in the DCI scheduling the PDSCH.

FIG. 1 illustrates an example of mapping of HARQ and delta-CQI/MCS feedback to a PUCCH. In the example of FIG. 1, the solid-filled PDSCHs boxes (e.g., PDSCH1 and PDSCH3 in the example of FIG. 1) means that delta-CQI/MCS shall be reported for the PDSCH, whereas empty-filled PDSCHs (e.g., PDSCH2 in the example of FIG. 1) means that only existing HARQ-ACK feedback is reported for the PDSCH.

As illustrated in the example of FIG. 1, in case more than one applicable PDSCH are mapped to the same PUCCH, certain embodiments may provide at least two alternative new rules. According to a first alternative, one delta-CQI/MCS report per applicable PDSCH may be appended to the HARQ-ACK information (A/N). With regards to the example of FIG. 1, the PUCCH may be constructed as [A/N 1, A/N 2, A/N 3, delta-CQI1, delta-CQI3]. In a second alternative, the UE only reports a single delta-CQI/MCS report per PUCCH regardless of the number of applicable PDSCHs mapped to the PUCCH. For this alternative, it may be further assumed that the delta-CQI/MCS is reported in the form of an absolute MCS/CQI index instead of as an offset. With regards to the example of FIG. 1, the PUCCH may be constructed as [A/N 1, A/N 2, A/N 3, F(delta-CQI1, delta-CQI3)], where function F may be, e.g., a maximum or minimum function such that the largest/lowest MCS/CQI value among the possible delta-CQI/MCS values is appended to the PUCCH, the MCS/CQI value corresponding to the PDSCH with the largest or smallest TBS mapped to the PUCCH, or the MCS/CQI value corresponding to the latest applicable PDSCH mapped to the PUCCH, i.e., PDSCH 3 in FIG. 1. Comparing the first alternative with the second alternative, the latter can reduce the probability of having a PUCCH payload size mismatch between UE and gNB in case the UE misses one or multiple DCIs scheduling a PDSCH (since only one delta-CQI/MCS report is appended regardless of the number of PDSCH receptions).

In an embodiment, to deal with the possibility of the UE missing one or multiple DCIs scheduling applicable PDSCH(s), one or multiple counter fields may be included in the DCI scheduling a PDSCH. For example, similarly as the counter downlink assignment indicator (cDAI) used for HARQ-ACK reporting, a delta-CQI/MCS scheduling indicator (DSI) may be provided in the DCI which denotes the accumulative number of scheduled applicable PDSCH up to the current Physical Downlink Control Channel (PDCCH) monitoring occasion. For instance, if the UE receives a DCI with DSI=1 (or binary 01), and later receives another DCI with DSI=3 (or binary 11), the UE determines that it failed to detect the DCI scheduling an applicable PDSCH, and may take this into consideration when constructing the delta-CQI/MCS report (e.g., to ensure alignment of the PUCCH payload size between gNB and UE). In yet another embodiment, an increase of DSI between two DCI receptions may serve as an indication to the UE that delta-CQI/MCS shall be generated for the corresponding PDSCH.

In another embodiment, the delta-CQI/MCS feedback may be jointly coded with the HARQ-ACK feedback. With regards to FIG. 1, the PUCCH may be constructed as [X1, A/N 2, X3], where X1 and X3 is the joint-coded delta-CQI/MCS and HARQ information of PDSCH 1 and 3, respectively. For instance, 4-bits can be used for each XN report, where the most/least-significant bit represents the A/N outcome, and the remaining bits represent the delta-CQI/MCS information. Additionally, in case the delta-CQI/MCS is only reported together with a negative HARQ feedback, one of the $2^4$ possible values, e.g., 0000 may be defined for ACK reporting, whereas remaining $2^4-1$ values may be used to indicate NACK plus the corresponding delta-CQI/MCS value.

In yet another embodiment, delta-CQI/MCS reporting resource and timing may be configured in CSI reporting settings. The configuration may indicate, for example, reporting periodicity and offset, for periodic or semi-persistent CSI or offset list for aperiodic CSI reporting. Additionally, the configuration may also indicate PUCCH resource or resource list for CSI reporting. The configured uplink reporting resource/resources may (or may not) overlap with a PUCCH for HARQ-ACK feedback, in which case existing UCI prioritization/multiplexing rules may be reused.

According to an embodiment, the gNB may define a time window for which the feedback from applicable PDSCHs will be collected (note that this may not be needed for certain embodiments since the mapping of PDSCH to PUCCH is provided by existing PDSCH-to-HARQ_feedback timing). For example, the time window may be provided in unit of ms, OFDM symbols, slots, subframes, etc. FIG. 2 illustrates an example of mapping delta-CQI/MCS feedback to a periodically-configured PUCCH, using a gNB-defined time window of 2 slots. For example, the feedback may refer to delta-CQI/MCS information and/or HARQ feedback. Thus, for example, delta-CQI/MCS may be collected on the subset (i.e. at least one downlink channel, such as PDSCH, of a plurality of downlink channels received by UE) for the duration of the time window. As indicated above, the network, such as gNB, may configure the time window to the UE.

In an embodiment, delta-CQI/MCS may be handled as a high priority CSI report or be given higher priority and be handled, at least, as a low-priority HARQ, when applying intra-UE multiplexing and CSI omission rules. In case more than one applicable PDSCH are mapped to the same PUCCH, the same rules discussed above for generating the delta-CQI/MCS information can be applied.

In an embodiment, delta-CQI/MCS may be reported according to a periodic, semi-persistent, aperiodic, event-triggered periodic/semi-persistent time domain behavior. In case of aperiodic reporting, reporting time and resource may, at least, partially be defined based on information within a DL or UL DCI. This information can include time offset indicator and/or resource indicator. These indicators may select one reporting offset and one reporting resource, respectively, from configured lists within CSI reporting setting. In case of semi-persistent/periodic reporting, the reporting time and resource may be given by the CSI reporting setting. In some variants, rules are defined so that delta-CQI/MCS reporting is delayed or transmitted in different resource, when collision with higher priority information, e.g. HP HARQ, occurs.

According to an embodiment, in event-triggered periodic/semi-persistent, delta-CQI/MCS may be transmitted when one or several of the following events occur: computed delta-CQI/MCS is lower or higher than a configured threshold, BLEP/BLER higher or lower than a configured threshold, SINR higher or lower than a configured threshold, NACK, and/or high interference measured on CMR/IMR/CSI-IM higher/lower than a configured threshold.

Figure 3:
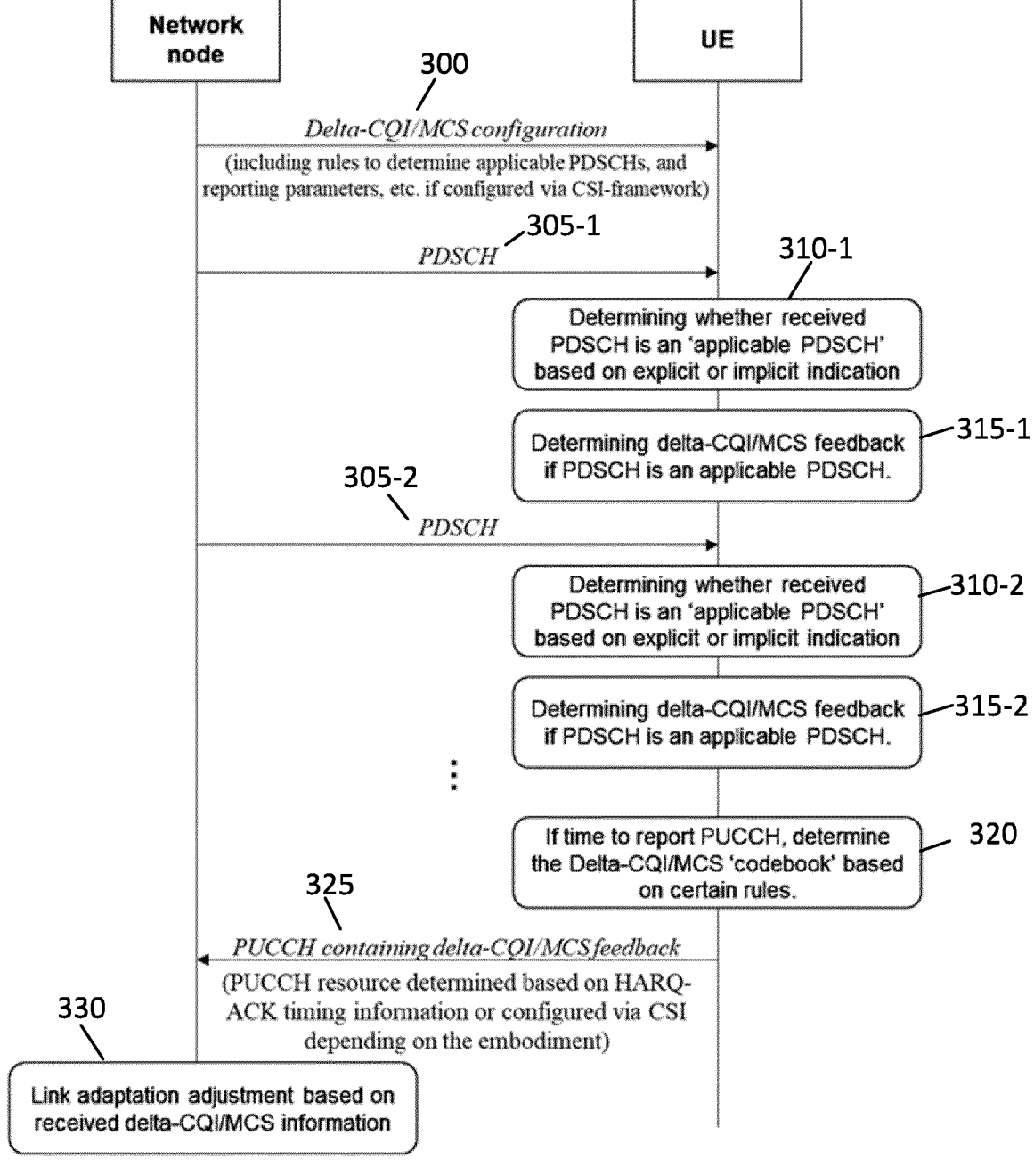
FIG. 3 illustrates an example signaling diagram, according to one embodiment.

FIG. 3 illustrates an example signaling diagram between a network node (e.g., a gNB) and a UE, according to an embodiment. As illustrated in the example of FIG. 3, at 300, the network node may configure the UE to report delta-CQI/MCS configuration, including the rules to determine for which PDSCHs the delta-CQI/MCS will be reported. The configuration 300 may also include reporting settings (PUCCH resource/periodicity, time windows, etc.) if considered as part of CSI information.

As further illustrated in the example of FIG. 3, at 305-1 and 305-2, the UE may receive PDSCH from the network node. For each received PDSCH, the UE may check, at 310-1 or 310-2, whether delta-CQI/MCS shall be reported and, at 315-1 or 315-2, may determine and store the corresponding delta-CQI/MCS information. This information may sometimes be referred to as delta-CQI/MCS feedback. When it is time to report PUCCH, the UE may generate, at 320, a sequence of bits representing the delta-CQI/MCS information, which could be, e.g., a max( ) or min( ) function of each delta-CQI/MCS from each individual PDSCH. As shown, at 325, the delta-CQI/MCS information may be reported in the PUCCH provided, e.g., via the HARQ-ACK timing or configured via CSI report. As also illustrated in the example of FIG. 3, at 330, the network node may perform link adaptation adjustment based on the received delta-CQI/MCS information.

FIG. 4A illustrates an example flow diagram of a method for reporting of delta channel quality indicator (CQI)/modulation and coding scheme (MCS) feedback, according to an example embodiment. In certain example embodiments, the flow diagram of FIG. 4A may be performed by a network entity or network node in a communications system, such as LTE or 5G NR. In some example embodiments, the network entity performing the method of FIG. 4A may include or be included in a base station, access node, node B, eNB, gNB, NG-RAN node, transmission-reception points (TRPs), high altitude platform stations (HAPS), relay station or the like. In one embodiment, the network node performing the method of FIG. 4A may include a gNB, such as the network node illustrated in the example of FIG. 3 or similar radio node.

As illustrated in the example of FIG. 4A, the method may include, at 405, transmitting or providing, to a UE, a configuration for reporting delta-CQI/MCS information. In an embodiment, the configuration may include at least one or more rules for determining for which one or more downlink channels, which are a subset of the downlink channels received by the UE, the delta-CQI/MCS will be reported. For example, according to an embodiment, the one or more downlink channels may be a subset of the downlink channels received by the UE. In an embodiment, the one or more downlink channels may include more than one downlink channel for which the delta-CQI/MCS information will be reported. In one embodiment, the delta-CQI/MCS information may be indicated as or may include a delta-CQI/MCS function, as provided in the examples discussed above. According to one example, the downlink channels may be PDSCHs or similar channel. In an embodiment, the downlink channels for which the delta-CQI/MCS will be reported may be a subset of the downlink channels configured for the UE and, as discussed above, the downlink channels may be PDSCHs or similar channel.

Thus, in certain embodiments, the delta-CQI/MCS feedback may be limited to a subset of scheduled downlink channels (e.g., PDSCHs), and the subset may be determined using at least one selection rule. For example, the selection rule(s) may include one or more of selecting downlink channels associated to certain HARQ processes IDs, selecting downlink channels associated to a certain physical layer priority, selecting downlink channels with a TBS below or above a certain network-configured value or with a MCS above or below a certain configured MCS index, selecting downlink channels with associated PDSCH-to-HARQ feedbacktiming indicator, selecting downlink channels scheduled with a certain DCI format, selecting downlink channels that are transmitted only with a predefined RV, selecting downlink channels that are corresponding only to initial transmissions, selecting downlink channels that are transmitted with certain multiple-input multiple-output (MIMO) rank, based on a dynamic indication provided to the UE indicating a need for reporting the delta-CQI/MCS feedback with a new field in the DCI scheduling the downlink channel, and/or based on receiving an activation or deactivation via medium access control (MAC)-level signalling for one or multiple downlink channels.

As further illustrated in the example of FIG. 4A, the method may include, at 410, receiving, from the UE, the delta-CQI/MCS information. According to an embodiment, the delta-CQI/MCS feedback may include an offset between an actual MCS of the one or more downlink channels and a MCS recommended by the UE, or an absolute MCS or CQI index provided by the UE as determined from reception of the data on the one or more downlink channels. According to some embodiments, when more than one of the downlink channels are mapped to the same PUCCH, the receiving 410 may include receiving a single delta-CQI/MCS report per PUCCH derived from the number of PDSCHs that are mapped to the same PUCCH. In this case, the receiving 410 may include at least one of: receiving a maximum and/or minimum value from the possible delta-CQI/MCS values, receiving the delta-CQI/MCS value corresponding to the downlink channel with the largest or smallest TBS, and/or receiving the delta-CQI/MCS value corresponding to the latest applicable downlink channel TB.

In one embodiment, the delta-CQI/MCS information may be appended to HARQ feedback generated by the UE. For example, this may mean that delta-CQI/MCS information and HARQ feedback (e.g. ACK/NACK) are indicated in separate fields. Fields may comprise one or more bits for the indication, for example. Thus, for example, the HARQ feedback may be indicated in a first field and the delta-CQI/MCS information (e.g. function) may be indicated in a second field, wherein the first and second fields are jointly transmitted (i.e. transmitted together). In another embodiment, the delta-CQI/MCS information may be jointly encoded with HARQ feedback generated by the UE. For example, this may mean that delta-CQI/MCS information and HARQ feedback are indicated with one field (i.e. same field). Thus, for example, CQI/MCS and HARQ information may be jointly encoded and indicated with one bit sequence located in one data field. In some embodiments, a timing and resource for the reporting of the delta-CQI/MCS information may be determined based on a CSI reporting configuration or based on a CSI reporting configuration and dynamic DL signaling.

In certain embodiments, the method may include providing a counter, such as the DSI discussed above, in a DCI scheduling the downlink channels for which the delta-CQI/MCS will be reported. For example, the counter may denote a cumulative number of scheduled downlink channels up to the current control channel monitoring occasion. According to one example, an increase of the counter between DCI receptions may indicate to the UE to generate the delta-CQI/MCS information for the downlink channel scheduled by the DCI.

According to certain embodiments, the method may also include defining a time window for which feedback from the subset of downlink channels will be collected. In some embodiments, as illustrated in the example of FIG. 4A, at 415, the method may optionally include performing link adaptation adjustment based on the received delta-CQI/MCS information.

FIG. 4B illustrates an example flow diagram of a method for reporting of delta channel quality indicator (CQI)/modulation and coding scheme (MCS) feedback, according to one embodiment. In certain example embodiments, the flow diagram of FIG. 4B may be performed by a network entity or network node in a communications system, such as LTE or 5G NR. In some example embodiments, the network entity performing the method of FIG. 4B may include or be included in UE, sidelink UE, communication node, mobile equipment (ME), mobile station, mobile device, stationary device, IoT device, or other device. According to an embodiment, the method of FIG. 4B may include operations similar to those illustrated in the example of FIG. 3 or discussed elsewhere herein.

As illustrated in the example of FIG. 4B, the method may include, at 450, receiving or obtaining, from a network node, information on reporting parameters for reporting delta-CQI/MCS. In an embodiment, the reporting parameters may include at least one or more rules for determining for which downlink channels the delta-CQI/MCS will be reported. According to one example, the downlink channels may be PDSCHs or similar channel.

As further illustrated in the example of FIG. 4B, the method may also include, at 455, determining a delta-CQI/MCS information for one or more downlink channels that is a subset of a plurality of downlink channels received by the UE. In an embodiment, the subset of the downlink channels may include more than one downlink channel for which the delta-CQI/MCS will be reported. In one embodiment, the delta-CQI/MCS may be indicated for the plurality of downlink channels as a delta-CQI/MCS function, as provided in the examples discussed above. In an embodiment, the downlink channels for which the delta-CQI/MCS will be reported may be a subset of the downlink channels configured for the UE and, as discussed above, the downlink channels may be PDSCHs or similar channel. In an embodiment, the downlink channels for which the delta-CQI/MCS will be reported may be a subset of the PDSCHs received by the UE.

In some embodiments, the delta-CQI/MCS may include an offset between an actual MCS of the one or more downlink channels and a recommended MCS, or an absolute MCS or CQI index as determined from reception of data on the one or more downlink channels. In an embodiment, the determining 455 may include determining a MCS that fulfils a BLER target for a TB of the one or more downlink channels. In case the downlink channel (e.g., PDSCH) is transmitted using multiple repetitions, e.g., a fixed number of repetitions configured via pdsch-AggregationFactor in PDSCH-Config (Radio resource control, RRC, information element defined in TS 38.331) or dynamically indicated number of repetitions, the UE may consider only the first downlink channel (e.g., PDSCH) occasion or the soft combined downlink channel (e.g., PDSCH) when deriving the delta-CQI/MCS.

According to an embodiment, the method may include determining UL resource and report timing for the reporting of the delta-CQI/MCS information based at least one one of a reporting configuration, a determination of the subset of data transmissions for which the delta-CQI/MCS will be reported, and/or DL signaling for HARQ-ACK feedback.

In certain embodiments, the method may also include, at 460, reporting, to the network node, the delta-CQI/MCS information for the one or more downlink channels using the reporting parameters. According to an embodiment, the reporting 460 may include appending the delta-CQI/MCS information to HARQ feedback. In an embodiment, the reporting 460 may include jointly encoding the delta-CQI/MCS information with HARQ feedback.

According to some embodiments, uplink resource and report timing for the reporting may be determined based on CSI reporting configuration or based on CSI reporting configuration and dynamic DL signaling. In certain embodiments, the reporting may be performed for a subset of TBs of the downlink channels, and the subset of the downlink channels may be determined using at least one selection rule. For example, the selection rule(s) may include one or more of: selecting downlink channels associated to certain HARQ processes IDs, selecting downlink channels associated to a certain physical layer priority, selecting downlink channels with a TBS below or above a certain network-configured value or with a MCS above or below a certain configured MCS index, selecting downlink channels with associated PDSCH-to-HARQ feedbacktiming indicator, selecting downlink channels scheduled with a certain DCI format, selecting downlink channels that are transmitted only with a predefined RV, selecting downlink channels that are corresponding only to initial transmissions, selecting downlink channels that are transmitted with certain multiple-input multiple-output (MIMO) rank, based on a dynamic indication provided to the UE indicating a need for reporting the delta-CQI/MCS information with a new field in the DCI scheduling the downlink channel, and/or based on receiving an activation or deactivation via medium access control (MAC)-level signalling for one or multiple downlink channels.

According to a further embodiment, the selection rule(s) may include selecting delta-CQI/MCS information for one or more TBs whose delta-CQI/MCS information indicates a largest delta value towards more robust MCSs, and the reporting 460 may include reporting the delta value and an identifier to assist the network node to associate the delta value with a TB that was earlier transmitted.

In one embodiment, when more than one of the downlink channels are mapped to the same PUCCH, the reporting 460 may include reporting a single delta-CQI/MCS report per PUCCH derived from the number of the downlink channels that are mapped to the same PUCCH. In this case, the reporting 460 may further include at least one of: reporting a maximum and/or minimum value from the possible delta-CQI/MCS values, reporting the delta-CQI/MCS value corresponding to the downlink channel with the largest or smallest TBS, and/or reporting the delta-CQI/MCS value corresponding to the latest applicable downlink channel TB.

It is noted that in some embodiments, the UE may be configured to transmit delta-CQI/MCS information regarding downlink channels received by the UE. That is, in some examples, the UE may be configured to transmit said information on all downlink channel(s) it is receiving rather than just a subset. As noted above, it may be beneficial to indicate said information for a subset of channel(s), but sometimes indication for all channels may be needed. Therefore, the described further solutions may be applicable to both reporting delta-CQI/MCS information on subset of channel(s) and reporting delta-CQI/MCS information on all channels.

Figures 5A, 5B:
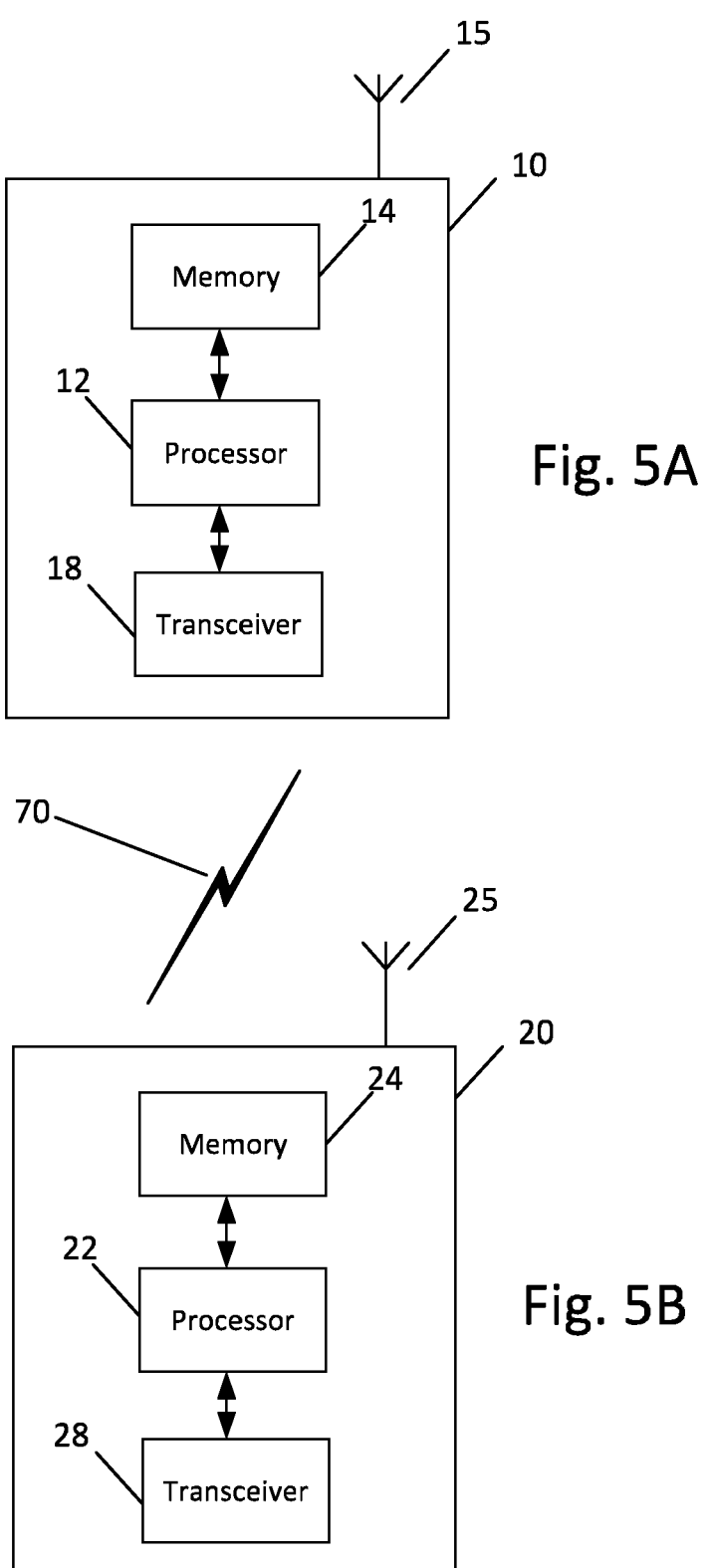
FIG. 5A illustrates an example block diagram of an apparatus, according to an embodiment.
FIG. 5B illustrates an example block diagram of an apparatus, according to an embodiment.

FIG. 5A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5A.

As illustrated in the example of FIG. 5A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 5A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, WLAN access point, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 3, 4A, 4B, or any other method described herein. In some embodiments, as discussed herein, apparatus 10 may be configured to perform a procedure relating to reporting of delta channel quality indicator (CQI)/modulation and coding scheme (MCS) feedback, as discussed elsewhere herein, for example.

FIG. 5B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5B.

As illustrated in the example of FIG. 5B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIG. 3, 4A or 4B, or any other method described herein. For example, in an embodiment, apparatus 20 may be controlled to perform a process relating to reporting of delta channel quality indicator (CQI)/modulation and coding scheme (MCS) feedback, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and/or management. For example, as discussed in detail above, certain embodiments provide an approach for reporting of delta channel quality indicator (CQI)/modulation and coding scheme (MCS) feedback. For example, in some embodiments, a subset of PDSCHs may be selected for reporting CQI or MCS, and the network (e.g., gNB) and UE are able to have a common understanding of what is assumed for delta-CQI/MCS reporting. As such, certain embodiments can reduce overhead and improve network performance. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

The invention claimed is:

1. A method comprising:

obtaining, by a user device, information on reporting parameters to report delta- channel quality indicator (CQI)/modulation and coding scheme (MCS), wherein the delta- CQI/MCS information comprises:

an offset between an actual MCS of the at least one downlink channel and a MCS recommended by the user device; and a function indicating delta-CQI/MCS for a subset of a plurality of downlink channels, wherein the subset of the plurality of downlink channels is mapped to a same physical uplink control channel (PUCCH);

determining, by the user device, a delta-CQI/MCS that would have fulfilled a block error rate (BLER) target for a transport block of at least one downlink channel that is the subset of the plurality of downlink channels received by the user device; and reporting, to a network node, the following:

the delta-CQI/MCS information for the at least one downlink channel using the reporting parameters;

a single delta-CQI/MCS function per PUCCH derived from a number of downlink channels in the subset that are mapped to a same PUCCH;

a maximum and minimum value from the possible delta-CQI/MCS values;

the delta-CQI/MCS value corresponding to the downlink channel with a largest or smallest transport block size (TBS), and the delta-CQI/MCS value corresponding to a latest applicable downlink channel transport block, wherein the reporting parameters comprise rules for determining the subset for which the delta-CQI/MCS information will be reported, wherein the rules comprise:

selecting downlink channels associated with certain hybrid automatic repeat request (HARQ) processes identifiers (IDs);

selecting downlink channels associated with a certain physical layer priority;

selecting downlink channels with a transport block size (TBS) below or above a certain network-configured value, or with a MCS above or below a certain configured MCS index;

selecting downlink channels with associated PDSCH-to- HARQJeedback timing indicator;

selecting downlink channels scheduled with a certain downlink control information (DCI) format;

selecting downlink channels that are transmitted only with a predefined redundancy version (RV);

selecting downlink channels that are corresponding only to initial transmissions;

selecting downlink channels that are transmitted with certain multiple-input multiple-output (MIMO) rank;

based on a dynamic indication from the network node indicating a need for reporting delta-CQI/MCS information with a new field in the DCI scheduling the downlink channel;

based on receiving an activation or deactivation via medium access control (MAC)-level signalling for one or multiple downlink channels; and selecting delta-CQI/MCS information for one or more transport blocks whose delta-CQI/MCS information indicates a largest delta value towards more robust modulation and coding schemes, wherein the reporting comprises reporting the delta value and an identifier to assist the network node to associate the delta value with a transport block that was earlier transmitted.

2. The method of claim 1, wherein the subset comprises more than one downlink channel for which the delta-CQI/MCS information will be reported.

3. The method of claim 2, wherein the reporting further comprises appending the delta-CQI/MCS information to hybrid automatic repeat request (HARQ) feedback; and jointly encoding the delta-CQI/MCS information with HARQ feedback.

4. The method of claim 3, wherein uplink resource and report timing for the reporting of the delta-CQI/MCS are determined based on channel state information (CSI) reporting configuration and dynamic downlink (DL) signaling.

5. The method of claim 4, wherein a counter is provided in a downlink control information (DCI) scheduling the at least one downlink channel, the counter denoting an accumulative number of scheduled physical downlink shared channels up to a current control channel monitoring occasion.

6. The method of claim 5, wherein an increase of the counter between DCI receptions indicate to the user device to generate the delta-CQI/MCS feedback for the downlink channel scheduled by the DCI.

7. The method of claim 6, wherein a time window is defined for which feedback from the subset will be collected.

8. A user equipment comprising:

a processor; and a memory comprising computer-executable instructions that, when executed by the processor, cause the processor to perform the following operations:

obtaining, by a user device, information on reporting parameters to report delta-channel quality indicator (CQI)/modulation and coding scheme (MCS), wherein the delta-CQI/MCS information comprises:

an offset between an actual MCS of the at least one downlink channel and a MCS recommended by the user device; and a function indicating delta-CQI/MCS for a subset of a plurality of downlink channels, wherein the subset of the plurality of downlink channels is mapped to a same physical uplink control channel (PUCCH);

determining, by the user device, a delta-CQI/MCS that would have fulfilled a block error rate (BLER) target for a transport block of at least one downlink channel that is the subset of the plurality of downlink channels received by the user device;

reporting, to a network node, the following:

the delta-CQI/MCS information for the at least one downlink channel using the reporting parameters;

a single delta-CQI/MCS function per PUCCH derived from a number of downlink channels in the subset that are mapped to a same PUCCH;

a maximum and minimum value from the possible delta-CQI/MCS values;

the delta-CQI/MCS value corresponding to the downlink channel with a largest or smallest transport block size (TBS); and the delta-CQI/MCS value corresponding to a latest applicable downlink channel transport block, wherein the reporting parameters comprise rules for determining the subset for which the delta-CQI/MCS information will be reported, wherein the rules comprise:

selecting downlink channels associated with certain hybrid automatic repeat request (HARQ) processes identifiers (IDs);

selecting downlink channels associated with a certain physical layer priority;

selecting downlink channels with a transport block size (TBS) below or above a certain network-configured value, or with a MCS above or below a certain configured MCS index;

selecting downlink channels with associated PDSCH-to- HARQJeedback timing indicator;

selecting downlink channels scheduled with a certain downlink control information (DCI) format;

selecting downlink channels that are transmitted only with a predefined redundancy version (RV);

selecting downlink channels that are corresponding only to initial transmissions;

selecting downlink channels that are transmitted with certain multiple-input multiple-output (MIMO) rank;

based on a dynamic indication from the network node indicating a need for reporting delta-CQI/MCS information with a new field in the DCI scheduling the downlink channel;

based on receiving an activation or deactivation via medium access control (MAC)-level signalling for one or multiple downlink channels; and selecting delta-CQI/MCS information for one or more transport blocks whose delta-CQI/MCS information indicates a largest delta value towards more robust modulation and coding schemes, wherein the reporting comprises reporting the delta value and an identifier to assist the network node to associate the delta value with a transport block that was earlier transmitted.

9. The user equipment of claim 8, wherein the subset comprises more than one downlink channel for which the delta-CQI/MCS information will be reported.

10. The user equipment of claim 9, wherein the reporting further comprises appending the delta-CQI/MCS information to hybrid automatic repeat request (HARQ) feedback; and jointly encoding the delta-CQI/MCS information with HARQ feedback.

11. The user equipment of claim 10, wherein uplink resource and report timing for the reporting of the delta-CQI/MCS are determined based on channel state information (CSI) reporting configuration and dynamic downlink (DL) signaling.

12. The user equipment of claim 11, wherein a counter is provided in a downlink control information (DCI) scheduling the at least one downlink channel, the counter denoting an accumulative number of scheduled physical downlink shared channels up to a current control channel monitoring occasion.

13. The user equipment of claim 12, wherein an increase of the counter between DCI receptions indicate to the user device to generate the delta-CQI/MCS feedback for the downlink channel scheduled by the DCI.

14. The user equipment of claim 13, wherein a time window is defined for which feedback from the subset will be collected.

* * * * *